US012562913B2

(12) United States Patent
Sun et al.

(10) Patent No.: US 12,562,913 B2
(45) Date of Patent: Feb. 24, 2026

(54) POLYLITHIC SYNTAX ZERO KNOWLEDGE JOINT PROOF METHOD, APPARATUS AND SYSTEM

(71) Applicant: HUAWEI TECHNOLOGIES CO., LTD., Shenzhen (CN)

(72) Inventors: Sheng Sun, Kanata (CA); Wen Tong, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 98 days.

(21) Appl. No.: 18/405,066

(22) Filed: Jan. 5, 2024

(65) Prior Publication Data

US 2024/0154812 A1      May 9, 2024

Related U.S. Application Data

(63) Continuation of application No. PCT/CN2022/104212, filed on Jul. 6, 2022.

(60) Provisional application No. 63/218,758, filed on Jul. 6, 2021.

(51) Int. Cl.
*H04L 9/32*      (2006.01)

(52) U.S. Cl.
CPC .................................. *H04L 9/3221* (2013.01)

(58) Field of Classification Search
CPC . H04L 9/3221; H04L 9/3218; H04L 2209/46; G09C 1/00
See application file for complete search history.

(56) References Cited

U.S. PATENT DOCUMENTS

| | | | | |
|---|---|---|---|---|
| 12,200,100 | B2 * | 1/2025 | Wang ...................... | H04L 9/085 |
| 2011/0110525 | A1 * | 5/2011 | Gentry ..................... | H04L 9/14 |
| | | | | 380/285 |
| 2012/0002811 | A1 * | 1/2012 | Smart ..................... | H04L 9/085 |
| | | | | 380/255 |
| 2012/0079602 | A1 * | 3/2012 | Kolesnikov ............... | H04L 9/14 |
| | | | | 726/26 |
| 2015/0311326 | A1 | 10/2015 | Ogura et al. | |
| 2020/0153627 | A1 | 5/2020 | Wentz | |
| 2020/0220851 | A1 | 7/2020 | Storm et al. | |

FOREIGN PATENT DOCUMENTS

| | | |
|---|---|---|
| CN | 111863165 A1 | 7/2023 |
| EP | 3754898 A1 | 12/2020 |

OTHER PUBLICATIONS

Heath David et al.: "Stacked Garbling for Disjunctive Zero-KnowledgeProofs", May 1, 2020 (May 1, 2020), 20200501, pp. 569-598, XP047550435.

(Continued)

*Primary Examiner* — John B King

(57) ABSTRACT

A method, apparatus and system for implementing zero-knowledge proofs is provided. Partitioned garbled circuits are used to achieve a joint zero-knowledge proof system with full syntax verification. A polylithic syntax is used for handling complex semantics involving more than one statement to be proved and verified. Multiple verifiers can participate in a coordinated manner to perform the verification. Different verifiers can perform different parts of the verification.

19 Claims, 11 Drawing Sheets

(56) References Cited

OTHER PUBLICATIONS

Fiat A., Shamir A. (1987) How to Prove Yourself: Practical Solutions to Identification and Signature Problems. Odlyzko A.M. (eds) Advances in Cryptology—CRYPTO' 86. CRYPTO 1986. Lecture Notes in Computer Science, vol. 263. Springer, Berlin, Heidelberg. https://doi.org/10.1007/3-540-47721-7_12.

Bellare, M. and Micali, S., Non-interactive oblivious transfer and applications, Proc. Advances in Cryptology-Crypto' 89, Springer-Verlag LNCS, 435 (1990), 547-557.

Yao, Andrew Chi-Chih (1986). "How to generate and exchange secrets". 27th Annual Symposium on Foundations of Computer Science (SFCS 1986). Foundations of Computer Science, 1986. pp. 162-167. doi:10.1109/SFCS.1986.25. ISBN 978-0-8186- 0740-0.

Bellare, M., Hoang, V. T. and Rogaway, P. Foundations of garbled circuits. In T. Yu, G. Danezis, and V. D. Gligor, editors, ACM CCS 12, pp. 784-796. ACM Press, Oct. 2012.

Mahmoody, M. and Pass, R., "The Curious Case of Non-Interactive Commitments", Sep. 10, 2012, p. 1-45.

Sun, Sheng & Wen, Dr. (2021). zk-Fabric, a Polylithic Syntax Zero Knowledge Joint Proof System.

* cited by examiner

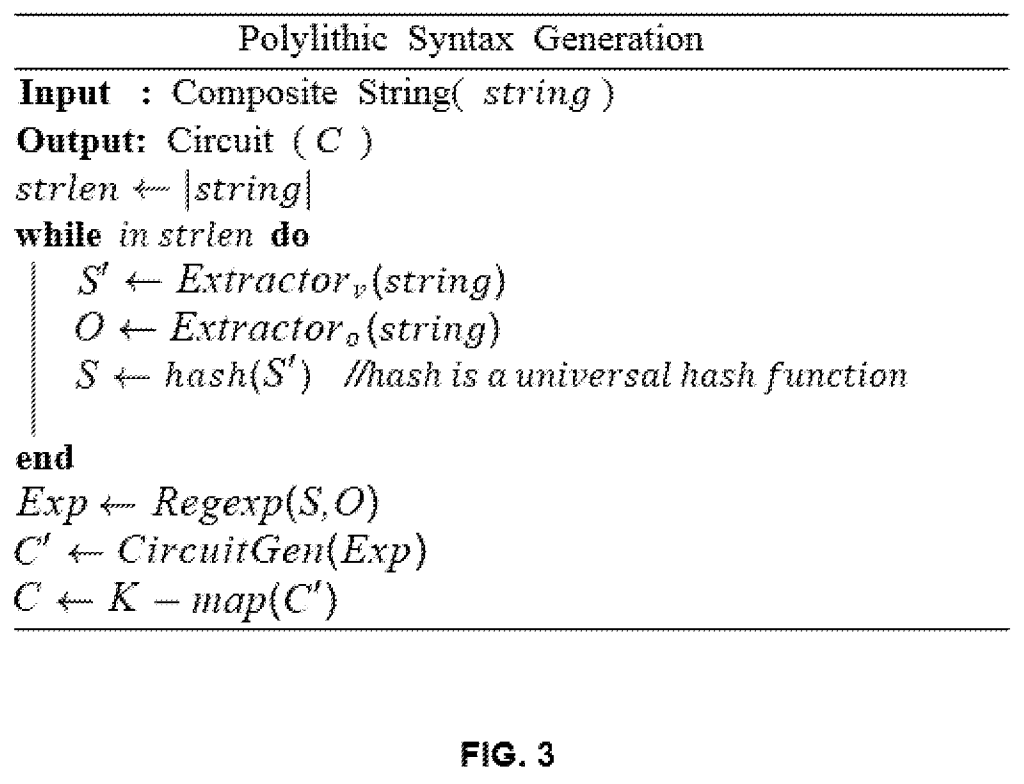

Polylithic Syntax Generation

Input : Composite String( *string* )

Output: Circuit ( $C$ )

$strlen \leftarrow |string|$ while *in strlen* do

$S' \leftarrow Extractor_v(string)$ $O \leftarrow Extractor_o(string)$ $S \leftarrow hash(S')$    *//hash is a universal hash function* end

$Exp \leftarrow Regexp(S,O)$ $C' \leftarrow CircuitGen(Exp)$ $C \leftarrow K - map(C')$

FIG. 3

Preparation    410

Garbled Circuit Construction 1    420

Garbled Circuit Construction 2    430

Garbled Circuit Construction 3    440

Partitioning of Garbled Circuit 1    450

Partitioning of Garbled Circuit 2    460

400

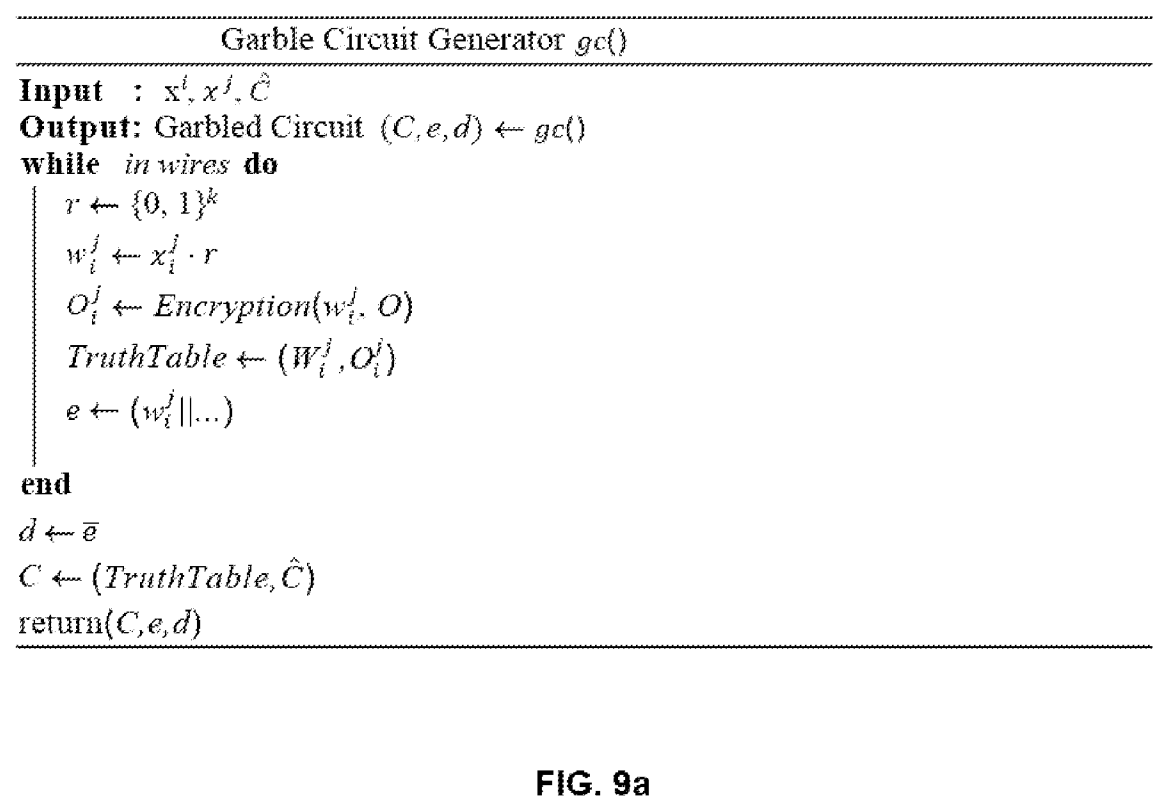

Garble Circuit Generator $gc()$

Input : $x_i^i, x_i^j, \hat{C}$
Output: Garbled Circuit $(C, e, d) \leftarrow gc()$
while *in wires* do

$\quad r \leftarrow \{0, 1\}^k$ $\quad w_i^j \leftarrow x_i^j \cdot r$ $\quad O_i^j \leftarrow Encryption(w_i^j, O)$ $\quad TruthTable \leftarrow (W_i^j, O_i^j)$ $\quad e \leftarrow (w_i^j \| \ldots)$ end

$d \leftarrow \bar{e}$ $C \leftarrow (TruthTable, \hat{C})$ return$(C, e, d)$

FIG. 9a

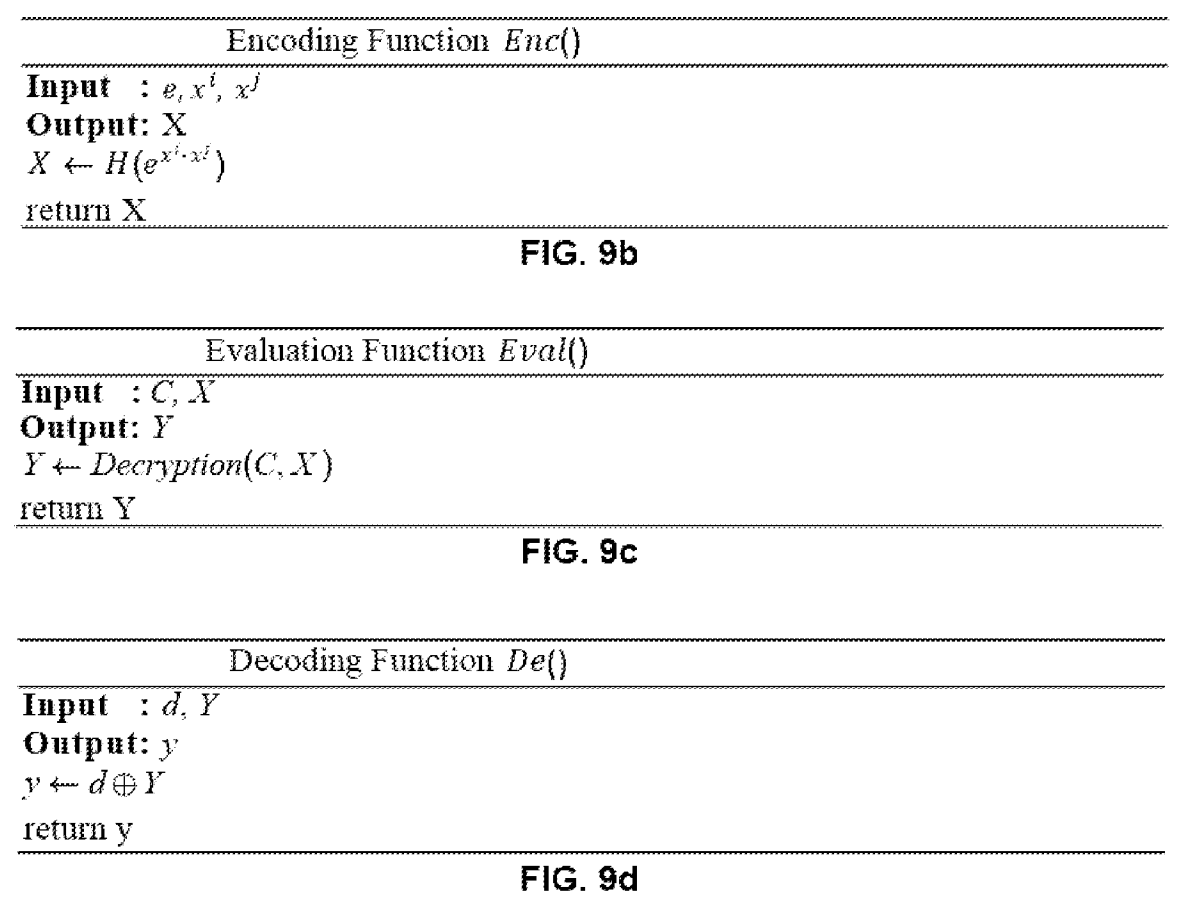

Encoding Function *Enc()*

Input : $e, x^i, x^j$
Output: X
$X \leftarrow H(e^{x^i \cdot x^j})$
return X

FIG. 9b

Evaluation Function *Eval()*

Input : C, X
Output: Y
$Y \leftarrow Decryption(C, X)$
return Y

FIG. 9c

Decoding Function *Dec()*

Input : d, Y
Output: y
$y \leftarrow d \oplus Y$
return y

FIG. 9d

POLYLITHIC SYNTAX ZERO KNOWLEDGE JOINT PROOF METHOD, APPARATUS AND SYSTEM

CROSS-REFERENCE TO RELATED APPLICATIONS

This application is a continuation of International Application No. PCT/CN2022/104212, filed on Jul. 6, 2022, which claims priority to U.S. Provisional Patent Application No. 63/218,758 entitled "Polylithic Syntax Zero Knowledge Joint Proof Method, Apparatus and System" filed Jul. 6, 2021, which is hereby incorporated by reference in its entirety.

TECHNICAL FIELD

This invention pertains generally to the field of secure information exchange and encrypted computation, and in particular to zero knowledge proofs in computerized communication systems.

BACKGROUND

Zero-knowledge proofs, also referred to as zero-knowledge protocols, are protocols by which one party (the prover) can prove (or demonstrate) to another (the verifier) that a statement is true, without revealing any information beyond the validity of the statement itself. For example, given the hash of a random number, the prover may use a zero-knowledge proof to convince the verifier that the prover actually owns (or knows) the number. In particular, without revealing what the number, the prover can construct a proof system which, when implemented, convincingly leads the verifier to conclude that the prover owns or knows the number. Ideally, a zero-knowledge proof convinces a verifier of a statement while revealing nothing but its own validity.

Since they were introduced by Goldwasser, Micali, and Rackoff, zero-knowledge (ZK) proofs have found applications in domains as diverse as user or device authentication and signature schemes, secure computation, and emerging shield transaction in blockchain technologies. Zero-knowledge proofs have a variety of applications in cryptography and secure communications, for example between electronic devices.

Two examples of zero knowledge technologies are zk-SNARK and zkBoo. Such technologies can be used to bring new versatile functionalities to existing communication and computing network infrastructures. Using such technologies, and given an interactive proof for any NP-complete problem, a device can construct zero-knowledge proofs or arguments for an arbitrary NP statement. NP statements are statements associated with an NP-complete problem, which a prover endeavors to demonstrate to be true (or false) via a zero-knowledge proof scheme. However, existing zero knowledge technologies are limited to a monolithic state. That is, the subject NP statement is limited to contain only one argument at a time. Another limitation of existing zero knowledge technologies are that computational overhead are significantly large and subject to improvement. This is because, for example, such techniques often require many iterations to be performed (e.g. many iterations of finding the arithmetic roots of a polynomial equation), in order to achieve an acceptably small (e.g. negligible) soundness error. Soundness error refers to the property that, if the NP statement is false, a prover cannot falsely convince a verifier that the NP statement is true, except with an acceptably small probability.

Therefore, there is a need for a method and apparatus and system for secure information exchange involving zero knowledge proof, that obviates or mitigates one or more limitations in the prior art.

This background information is intended to provide information that may be of possible relevance to the present disclosure. No admission is necessarily intended, nor should be construed, that any of the preceding information constitutes prior art against the present disclosure.

SUMMARY

Embodiments of the present disclosure provide for a zero knowledge proof method, apparatus and system. In particular, embodiments exhibit the properties of a polylithic syntax capability and joint verification. Embodiments of the present disclosure can be applied to secure information exchange, cryptography, user or device authentication, secure computing, blockchain, or other computing or communication technologies.

In accordance with an embodiment of the present disclosure, there is provided a method for performing a zero knowledge proof. The method includes, by a prover: performing a polylithic syntax decomposition on a statement to be proven. The method further includes, by the prover, generating a garbled circuit indicative of the statement following polylithic syntax decomposition. The method further includes, by the prover, partitioning the garbled circuit into a plurality of garbled circuit portions which collectively form a partitioned garbled circuit. The method further includes, by the prover, transmitting the partitioned garbled circuit, via a shared repository, toward multiple verifiers. The method further includes, by the multiple verifiers: jointly computing a digest of the garbled circuit, where each one of the multiple verifiers computes outputs of a corresponding one of the plurality of garbled circuit portions. The method further includes, by an aggregator belonging to the multiple verifiers: computing a value of a unified Boolean operation applied collectively to all of said outputs of the plurality of garbled circuit portions. The method further includes, by the aggregator: determining whether the value of the unified Boolean operation is equal to an expected value and indicating that the proof is verified if and only if the value of the unified Boolean operation is equal to the expected value.

In some embodiments, the statement has multiple aspects or variables, and the polylithic syntax decomposition comprises generating a Boolean circuit representation of the statement using multiple wires and multiple gates. The garbled circuit in such embodiments is generated from the Boolean circuit representation.

In some embodiments, the method further includes converting the statement into one or more regular expressions, and generating a Boolean circuit representation from the regular expressions. The garbled circuit is generated directly or indirectly from the Boolean circuit representation. In some further embodiments, the method further includes implementing a Karnaugh Map operation on the Boolean circuit representation to produce a simplified version of the Boolean circuit representation. In such further embodiments, the garbled circuit is generated directly or indirectly from the simplified version of the Boolean circuit representation.

In some embodiments, transmitting the partitioned garbled circuit toward multiple verifiers is performed using a non-interactive oblivious transfer.

In some embodiments, the method further includes performing a multiparty oblivious transfer scheme to facilitate interaction between the prover and the verifiers, interaction between the verifiers, or both.

In accordance with an embodiment of the present disclosure, there is provided an apparatus comprising a processor operatively coupled to memory and configured, by execution, by the processor, of program instructions stored in the memory, to perform the method as described above.

In accordance with an embodiment of the present disclosure, there is provided a system comprising a plurality of computing devices, the computing devices cooperatively configured to perform the method as described above.

In accordance with an embodiment of the present disclosure, there is provided a computer program product comprising a non-transitory computer readable medium having instructions stored thereon which, when executed by a computer processor, causes the computer to perform the method as described above.

In accordance with an embodiment of the present disclosure, there is provided an apparatus configured to perform the above-described method. The apparatus can be a computing device having a processor operatively coupled to memory, the memory storing program instructions for execution by the processor in order to perform operations in accordance with the method. The apparatus can be a plurality of computing devices.

In accordance with an embodiment of the present disclosure, there is provided a system configured to perform the above-described method. The system can include a plurality of computing devices each having a respective processor operatively coupled to a respective memory. Each respective memory stores program instructions for execution by the respective processor in order to perform operations in accordance with the method. The system can include computing devices operated by the prover and other computing devices operated by each respective one of one or more verifiers. The system can include intermediate computing devices operated by a coordinating party which is not necessarily the prover or one of the verifiers.

According to embodiments, the system includes a prover computing device and multiple verifier computing devices. The prover computing device is configured to: perform a polylithic syntax decomposition on a statement to be proven; generate a garbled circuit indicative of the statement following polylithic syntax decomposition; partition the garbled circuit into a plurality of garbled circuit portions which collectively form a partitioned garbled circuit; and transmit the partitioned garbled circuit, via a shared repository, toward the multiple verifier devices. The multiple verifier computing devices are configured to: jointly compute a digest of the garbled circuit, wherein each one of the multiple verifier devices computes outputs of a corresponding one of the plurality of garbled circuit portions. An aggregator device belonging to the multiple verifier devices is configured to: compute a value of a unified Boolean operation applied collectively to all of said outputs of the plurality of garbled circuit portions; and determine whether the value of the unified Boolean operation is equal to an expected value and indicate that the proof is verified if and only if the value of the unified Boolean operation is equal to the expected value.

According to embodiments, there is provided a method comprising multiple operations by a prover, such as a computing device. The method includes performing a polylithic syntax decomposition on a statement to be proven. The method includes generating a garbled circuit indicative of the statement following polylithic syntax decomposition. The method includes partitioning the garbled circuit into a plurality of garbled circuit portions which collectively form a partitioned garbled circuit. The method includes transmitting the partitioned garbled circuit, via a shared repository, toward multiple verifiers.

According to embodiments, there is provided a method comprising multiple operations by a verifier such as a computing device. The method includes receiving a partitioned garbled circuit from a prover, via a shared repository. The method includes cooperating with one or more other verifiers to jointly compute a digest of the garbled circuit, wherein the verifier and one or more other verifiers each computes respective outputs of a corresponding one of the plurality of garbled circuit portions. The verifier or an aggregator belonging to the multiple verifiers performs further operations, for example as part of the method. These further operations include computing a value of a unified Boolean operation applied collectively to all of said outputs of the plurality of garbled circuit portions; and determining whether the value of the unified Boolean operation is equal to an expected value and indicate that the proof is verified if and only if the value of the unified Boolean operation is equal to the expected value.

According to embodiments, there is provided a computing device comprising a processor, a memory, and a network interface. The computing device is configured to perform a polylithic syntax decomposition on a statement to be proven. The computing device is configured to generate a garbled circuit indicative of the statement following polylithic syntax decomposition. The computing device is configured to partition the garbled circuit into a plurality of garbled circuit portions which collectively form a partitioned garbled circuit. The computing device is configured to transmit the partitioned garbled circuit, via a shared repository, toward multiple verifier devices.

According to embodiments, there is provided a computing device comprising a processor, a memory, and a network interface. The computing device is configured to receive a partitioned garbled circuit from a prover device, via a shared repository. The computing device is configured to cooperate with one or more other verifier devices to jointly compute a digest of the garbled circuit, wherein the computing device and one or more other verifier devices each computes respective outputs of a corresponding one of the plurality of garbled circuit portions. The computing device or an aggregator device belonging to the multiple verifier devices performs further operations, including computing a value of a unified Boolean operation applied collectively to all of said outputs of the plurality of garbled circuit portions; and determining whether the value of the unified Boolean operation is equal to an expected value and indicate that the proof is verified if and only if the value of the unified Boolean operation is equal to the expected value.

BRIEF DESCRIPTION OF THE DRAWINGS

FIG. 3 illustrates polylithic syntax decomposition operations in accordance with an embodiment of the present disclosure.

FIGS. 9*a* to 9*d* illustrate different operations performed in accordance with embodiments of the present disclosure.

It will be noted that throughout the appended drawings, like features are identified by like reference numerals.

DETAILED DESCRIPTION

Figure 1:
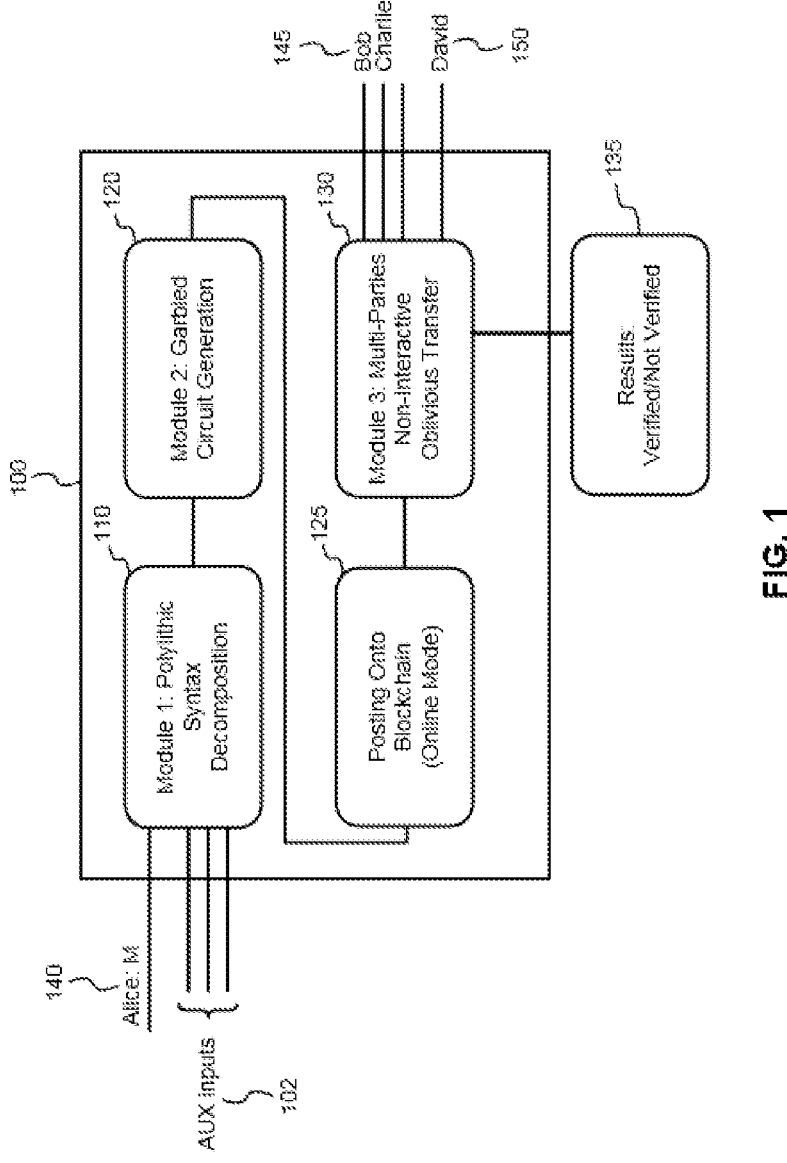
FIG. 1 illustrates an apparatus or system provided in accordance with embodiments of the present disclosure.

According to embodiments of the present disclosure, there is provided a zero knowledge proof method, apparatus and system. Such method, apparatus and system can be regarded as cryptographic in nature.

Embodiments of the present disclosure can provide for significantly strong privacy assurance with a full syntax verification capability. Accordingly, multiple variables (also referred to as aspects) within a statement (e.g. NP statement) can be substantially verified, substantially without revealing the true values of the variables. This relates to a polylithic property of the embodiments. Accordingly, such embodiments can be utilized in applications such as contract verification, auditing, etc. For example, a statement indicative of multiple items in a contract or multiple actions in a list of actions can be made and verified. Some embodiments can be implemented in a blockchain. For example, embodiments can be deployed within a blockchain system as a plug-in module providing a zero knowledge proof service. In such embodiments, multiple verifiers (e.g. anonymous verifiers) can jointly provide the zero knowledge proof.

Embodiments of the present disclosure pertain to how to use partitioned garbled circuits to achieve a joint zero-knowledge proof system. Such embodiments potentially have less overhead than some prior systems, full syntax verification, or both. Embodiments of the present disclosure which are based on partitioned garbled circuits may potentially be versatile and single-use, meaning they can be applied to arbitrary circuits with more comprehensive statements, and they can achieve non-interactivity among all participants. Non-interactivity may refer to a situation in which the participants are not in direct communication (e.g. via a handshake protocol) but rather parties exchange information through an intermediary, such as a public information repository (e.g. a computer Web server). At least one embodiment may be used for creating partitioned garbled circuits to match comprehensive Boolean logical expressions with multiple variables. The term "polylithic syntax" is used to refer to the context based multiple variables in a comprehensive statement. A joint zero knowledge proof protocol that uses partitioned garbled circuits is also disclosed. Different variations of the protocol are analyzed and compared to state-of-the-art protocols.

Embodiments of the present disclosure involve a group of verifiers which jointly compute a succinct digest of a garbled circuit C. The group of verifiers can be a cluster of verifiers communicating over a network such as the Internet. The group of verifiers can be anonymous. The garbled circuit C is prepared by a prover. The prover may also partition the garbled circuit C. The prover may also dispatch (e.g. randomly) the garbled circuit to a shared repository. The shared repository may be publicly accessible. In some embodiments the shared repository may be implemented as a blockchain. In some embodiments, the shared repository may be implemented as a Web portal. As used herein, randomness may refer to pseudo-randomness or true (as much as is technically possible) randomness. The prover (Alice) may scramble a circuit using randomness, and random dispatching of the garbled circuit may refer to posting the randomly scrambled circuit to the shared repository.

The prover and the verifiers can be, or can be associated with, different computing devices which are communicatively coupled via a communication network. In this regard, the prover can be a prover computing device, or prover networked computing device, and a verifier can be a verifier computing device, or verifier networked computing device. The computing devices can include one or more computer processors operatively coupled to memory, which may be magnetic, electronic or optical memory, for example. The computing devices can further include a communication interface for transmitting, receiving, or both transmitting and receiving information (e.g. as electrical, radio or optical signals) via a communication network. The memory stores program instructions for execution by the processor, and may also store information associated with the zero knowledge proof operations. Alternatively, the program instructions and information associated with the zero knowledge proof operations can be stored in separate memories of a computing device.

Embodiments of the present disclosure may provide for a public verification system which may be more comprehensive than those systems currently available. The verification system may be capable of validating more complex statements than currently possible, in view of the fact that prior technologies in this area are limited to conducting monolithic verifications. For example, in a monolithic verification, only a single hashed value in an arithmetic circuit can be verified at a time. Furthermore, embodiments of the present disclosure may substantially achieve substantially full privacy preserving computation (encrypted computation) based on oblivious transfer (OT) and garbled circuit approaches.

Accordingly, embodiments of the present disclosure may efficiently produce multi-party zero knowledge proofs based on a garbled circuit regime. Embodiments may also maintain what are deemed to be important features of an online zero knowledge proof system, for example being essentially non-interactive and succinct, and publishing to a blockchain to provide publicly retrievable information. This may be particularly applicable to providing a shield auditing service for example as used in blockchain technologies.

Various terms as used herein will be readily understood by a person skilled in the art having regard for example to zero knowledge proofs. For example, a garbled circuit refers to a cryptographic protocol, typically credited to Yao in "How to generate and exchange secrets," Yao, Andrew Chi-Chih, 27th Annual Symposium on Foundations of Computer Science (SFCS 1986), Foundations of Computer Science, 1986, 27th Annual Symposium on. pp. 162-167. Karnaugh maps are a well-known method implemented in circuit optimization. Garbled circuits and related "circuits" refer to logical data constructs rather than physical electrical circuits. Oblivious transfer is another cryptographic protocol which is known in the art. Functions may be understood to be functional aspects of a computer. That is, functions correspond to an aspect of a computer device which is configured, for example through computer program instructions, to produce output in a prescribed manner from a given input.

As will be readily understood, a garbled circuit is a tool used to "encrypt a computation," that reveals only the output of the computation, but reveals nothing about the inputs or any intermediate values. The "circuit" is referred to a combination of logical operations on inputs, and the syntax is expressed as a Boolean circuit, with the Boolean gates, such as (AND, OR, NOT) gates in the circuit. An example of a logical circuit is as follows. A classical Yao's "garbling scheme" includes a Garbler, Encoder and Verifier. The garbler converts a (plain) circuit C into a garbled circuit $\hat{C}$. The encoder converts a (plain) input x for the circuit into a garbled input $\hat{x}$. The secret randomness that was used to garble the circuit is used to encode x into $\hat{x}$. The verifier operates on a garbled circuit $\hat{C}$ and garbled input $\hat{x}$ and computes the circuit output C(x). It is not necessary to know x or the secret randomness inside $\hat{C}$ to evaluate and determine C(x). The main idea of security is that $\hat{C}$ and $\hat{x}$ together leak no more information than C(x). In particular, $\hat{C}$ and $\hat{x}$ ideally reveal nothing about x, yet they allow the computation C(x) to be completed. This approach is often referred as "Encrypted Computation."

FIG. 1 illustrates an apparatus or system 100 provided in accordance with embodiments of the present disclosure. The apparatus or system 100 can be implemented using a networked computing device, or a plurality of networked computing devices. The apparatus or system 100 can be implemented using computing hardware or firmware only, or a combination of computing hardware and software which causes the computing hardware to perform in a directed manner The apparatus or system 100 includes a plurality of components which are referred to as modules. Each module can be a separate structural, functional, or both structural and functional device. Modules may communicate with one another via a specified communication protocol. The first module is referred to as a polylithic syntax decomposition module 110. The second module is referred to as a garbled circuit generation module 120, which is implemented to construct a partitioned garbled circuit. The third module is referred to as a multi-party non-interactive oblivious transfer module 130, which is implemented to perform a non-interactive OT-based multi-party joint verification scheme. A posting module 125 which posts information to a publicly accessible location or medium, such as a web server or a blockchain, may also be included. The posting module 125 may be omitted in some embodiments.

According to FIG. 1, a prover 140, referred to for convenience as "Alice" bootstraps the apparatus or system 100 by invoking the first module 110 and the second module 120. In such a step, the first and second modules are used to prepare a partitioned garbled circuit for providing to multiple verifiers 145, examples of which are referred to for convenience as "Bob" and "Charlie." It is noted that the prover and verifiers may be or may include computing devices. The produced garbled circuits are distributed, for example by the prover 140, using the third module 130, to the verifiers. The distribution involves extended OT schemes. The distribution may involve the posting module 125 posting to online systems, such as a blockchain or web portals which may be publicly accessible. Using the online systems, the verifiers 145 compute intermediate circuit outputs each corresponding to one of the garbled circuits of the partition. Next, a garbled circuit OT-aggregator 150, which may be another verifier (e.g. referred to as "David"), computes the value Y of a unified Boolean operation applied to the evaluation output $Y_i$ for the $i^{th}$ garbled circuit (i.e. the intermediate circuit outputs). A unifying operation combines all the circuit outputs $Y_i$ before the last circuit (aggregation circuit). The garbled circuit OT-aggregator also determines if Y is equal to a value y which represents the expected value of Y. The garbled circuit OT-aggregator 150 (David) can then provide a result 135 indicative of whether or not the prover is verified (if Y=y) or not verified (otherwise).

FIG. 1 also illustrates auxiliary inputs 102 which may be provided by the prover 140 to the first module 110. Auxiliary inputs 102 may include inputs which provide information redundancy, which may be used to assist decoding of the garbled circuits.

It is noted that embodiments of the present disclosure, for example as illustrated in FIG. 1, provide for protection mechanisms which inhibit the problem of false proofs in accordance with the semi-honest model of zero knowledge proofs, as this problem would be readily understood by a worker skilled in the art. For example, if a party accesses the secret randomness (e.g. corresponding to a pseudo-random number generator seeds and algorithms) used to generate certain parameters in a proof, they would be able to create false proofs that are interpreted as true proofs by a verifier. Embodiments of the present disclosure generate public parameters using partitioned garbled circuits with a multiparty setting, which has the effect of inhibiting such false proofs from occurring or being feasible.

Embodiments of the present disclosure allow a cluster of verifiers, online anonymously and jointly, to compute a succinct digest of a garbled circuit C which is prepared by a prover. The succinct digest comprises a short indication, such as a single-bit binary output (e.g. "0" or "1.") The prover may also practice the partitioning of the garbled circuit and randomly dispatch the partitioned garbled circuit to a publicly accessible repository, e.g. a blockchain, or a web portal. This may provide for a more comprehensive public verification system which can validate more complex statements, compared with other technologies which can only conduct a monolithic verification. A monolithic verification can only compute a single hashed value in an arithmetic circuit at a time. Embodiments may also achieve substantially full privacy preserving computation (encrypted computation) based on OT and Garbled Circuits.

For security evaluation, embodiments can obtain the privacy against a semi-honest threat model. This can be formalized using a generalized Fiat-Shamir's secret sharing scheme (Fiat A., Shamir A. (1987) How To Prove Yourself: Practical Solutions to Identification and Signature Problems. In: Odlyzko A. M. (eds) Advances in Cryptology—CRYPTO' 86. CRYPTO 1986. Lecture Notes in Computer Science, vol 263. Springer, Berlin, Heidelberg. https://doi.org/10.1007/3-540-47721-7_12), which defines a t-secure n-party protocol and packs l secrets into a single polynomial. One can run a joint computation for all inputs by sending a constant number of field elements to the prover. As a result of packing l secrets into a single polynomial, the security bound t of embodiments of the present disclosure can be reduced, with multiple verifiers as $$t = \left\lfloor \frac{n-1}{2} \right\rfloor$$

to t'=t−l+1.

In various embodiments, OT is used to facilitate protection against potentially semi-honest (and thus semi-dishonest) participants. Various embodiments can achieve computational efficiency with one or both of the following two refinements. First, a Karnaugh Map technique is employed to reduce the logical gates numbers with simplified expression. Second, the garbled circuit is generated with partitions by (e.g. tightly) integrating the verification procedure with a multiparty OT scheme. This may reduce computational costs on the verifiers' side compared with other approaches. The security definition and efficiency requirement may imply that the Hash algorithm used to compute the succinct digest is collision resistant. Thus, the hash functions are typically keyed and may be keyed by a common reference string.

Figure 2:
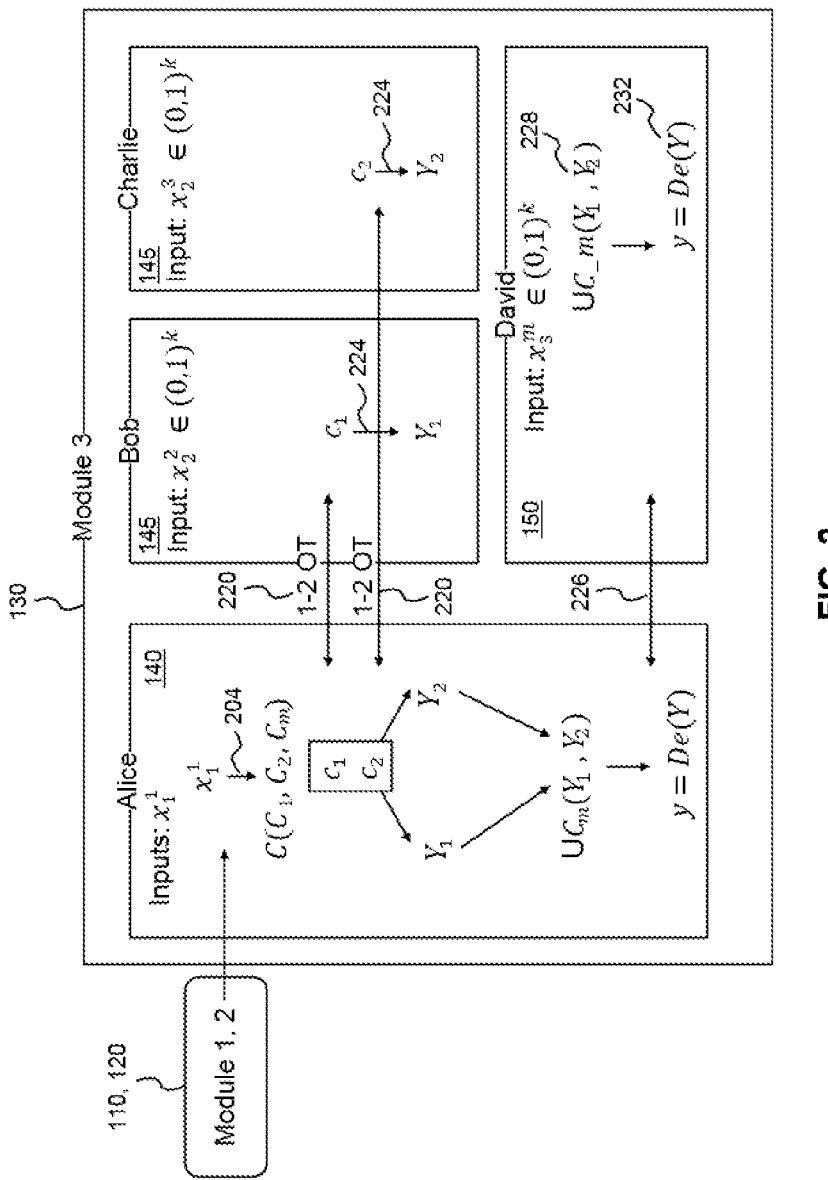
FIG. 2 illustrates operations performed in accordance with embodiment of the present disclosure.

FIG. 2 illustrates an embodiment of the present disclosure, in relation to an example of two polylithic inputs to be "blindly" verified by three offline verifiers with the construction of a partitioned garbled circuit. The prover Alice 140 bootstraps the process by invoking the first and second modules 110, 120, to prepare 204 a partitioned garbled circuit for multiple verifiers. The prover Alice 140 distributes the garbled circuit through the third module 130, using extended (e.g. 1-2) OT schemes 220 with the verifiers 145 through online systems, such as blockchain, or web portals that are publicly accessible. Through the public online systems, the verifiers 145, Bob and Charlie, compute 224 the intermediate circuit output $Y_i$ corresponding to each partitioned garbled circuit $C_i$. Alice 140 collects $Y_1$ and $Y_2$ from Bob and Charlie 145, respectively (via OT schemes 220). Alice 140 then provides $Y_1$ and $Y_2$ to David 150 via an OT scheme 226. At a subsequent step, a garbled circuit OT-aggregator David 150 computes 228 the Y and verifies 232 if the Y=y.

The circuit C can be considered a garbled circuit evaluation problem. In this problem, the prover Alice constructs a circuit C, consisting of Boolean gates operations over finite field GF(2), which is the Galois field of two elements. Generally, the circuit C can be partitioned with degree m with the input vector X. The circuit C therefore can be represented with a vector C: $(C_1, C_2, \ldots)^m$. As used herein, superscripts following parentheses typically represent length of a vector or corresponding circuit. The evaluation goal is to evaluate C on inputs X. In a non-interactive proof for this problem, the prover sends the outputs vector Y: $(Y_1, Y_2, \ldots)$ of C on input X, and the verifiers are to determine whether Y=C(X).

Referring back to FIG. 1, The polylithic syntax decomposition module 110 can be functionally regarded as performing an operation $C \leftarrow \text{syngen}(1^\lambda)$. The module 110 receives an input vector m: $(m_1, m_2, \ldots)$ and maps the input vector to a hashed vector X: $(x_1, x_2, \ldots) \leftarrow \text{hash}(m)$ as inputs of the security parameter $1^\lambda$. The module 110 outputs a Boolean gates-based expression C.

The garbled circuit generation module 120 can be functionally regarded as performing an operation $(C_1, C_2, \ldots)^m \leftarrow \text{xgcGen}(C)$. The module 120 takes the Boolean gates-based expression C as input and outputs an enumerated length of m garbled circuits $(C_1, C_2, \ldots)$, using native garbled circuit generator operations.

The multi-party non-interactive oblivious transfer module 130 can be functionally regarded as performing an operation $Y \leftarrow \text{OT-aggregator}(Y_1, Y_2, \ldots)^m$. The module 130 takes inputs from the outputs of the partitioned garbled circuits $(Y_1, Y_2, \ldots)^{m-1}$ and produces an aggregated output Y. That is, the module 130 operates on outputs of the partitioned garbled circuits. A verification operation can be performed (e.g. by module 130) to verify if Y is equal to the expected output for the extended garbled circuit operation, denoted xgc. That is:

$$\{Y = C(X) \mid y = f(m \oplus x_m^m)\} = \begin{cases} \text{True, if } Y = De(y) \\ \text{False, otherwise} \end{cases}.$$

Embodiments of the present disclosure employ a universal hashing operation, denoted $x_i \leftarrow h(S_i)$. The universal hashing operation takes a common reference string (crs) $S_i$ as input and outputs a uniformly distributed digest using universal hashing function h.

Embodiments of the present disclosure employ an extended garbled circuit operation gc, denoted as gc=(Gb, En, De, Ev). Gb is a randomized garbling operation that transforms f into a triplet $(C_i, e_i, d_i)$ where $C_i$ is the $i^{th}$ partitioned garbled circuit, $e_i$ is the corresponding encoding information for circuit $C_i$, and $d_i$ is the corresponding decoding information. En is an encoding operation that maps input $X_i$ into garbled input via $X_i = En(e_i, x_i)$. De is a decoding operation that maps garbled output $Y_i$ into plaintext output via $y_i = De(d_i, Y_i)$. Ev is an operation with inputs $X_i, F_i$ which generates garbled output $Y_i = Ev(F_i, X_i)$.

Certain embodiments of the present disclosure can exhibit security properties of correctness and privacy. In some embodiments, correctness can be formally described as follows. For all common reference strings with input size $\ell$, and all garbled circuits $C_i$ in C:

$$Pr\left[ y = Y \middle| \begin{array}{c} X(x_1, x_2, \ldots)^\lambda \leftarrow h(s_1, s_2, \ldots)^r \\ C \leftarrow synGen(X) \\ C(C_1, C_2, \ldots)^m \leftarrow xgcGen(C) \\ y_i = Y_i, \forall i \in C_i \\ Y_i = gc(C_i), \forall i \in C_i \\ Y \leftarrow OT - \text{aggregator}(Y_1, Y_2, \ldots Y_{m-1}) \end{array} \right] \approx 1.$$

In some embodiments, privacy can formally be described as the property that, for any non-interactive multiple parties oblivious transfer protocol $(S, R_i)$ between a sender S and multiple receivers $R_i$, the receiver $R_i$ does not learn any information on the input bits mapped to the corresponding circuit $C_i$, except with a negligible probability, e.g. a probability on the order $1/2^t$ where $\ell$ is the input size of the reference string.

Polylithic Syntax Decomposition Module

Certain details of the polylithic syntax decomposition module 110 will now be described. This module can operate to transform a full semantic statement from a prover into a polylithic syntax logical expression with Boolean operations. The module 110 reduces a full semantic statement to Boolean operations. The conversion can convert a complex input statement to an output in a manner which is suitable for efficiently constructing, from the output, Boolean-gate-based operations. The prover 140 possesses a composite statement to be verified, without revealing the actual value of the composite statement. The composite statement is converted, for example by the polylithic syntax decomposition module 110, into one or more regular expressions which represent a corresponding set of strings. Tools such as intrusion detection systems for example available at www.snort.org may be used. The polylithic syntax decomposition module 110, having generated these regular expressions, is configured to implement a regular expression matching operation. This operation is performed to detect a pattern (written by regular expressions) from the input strings.

An example of a composite statement is the simple sentence: "The car only starts [if] the "start" button is pressed [and] the brake pedal is pressed." The underlined portions of the sentence between the square-bracketed terms [•] represent the variables $S_i$ to be verified in an operator vector O, and the square-bracketed terms [•] represent logical relationships between these variables $S_i$. Compared with a monolithic native zero-knowledge proof system which can only process one variable at a time, embodiments of the present disclosure may operate to match the regular expression with patterns and construct corresponding circuits. A composite statement can be converted into a Boolean syntax having multiple variables and multiple Boolean operations, and the composite statement or Boolean syntax can be treated as a Boolean circuit. The Boolean circuit can then be partitioned to facilitate multiparty computation and subsequent multiparty verification.

The polylithic syntax decomposition module 110 may also be configured to implement a Karnaugh Map operation in order to reduce logical expression complexity. This can improve overall efficiency because the efficiency of embodiments of the present disclosure generally depends on complexity of the subject circuits being generated and handled. In some embodiments, there are less than or equal to six inputs in the input vector S.

FIG. 3 illustrates, using pseudo-code, a set of operations performed by the polylithic syntax decomposition module 110. The pseudo-code can be readily visualized by another means such as flow chart, and can be readily implemented by a computer executing corresponding coded instructions. According to FIG. 3, the polylithic syntax decomposition module 110 receives, as input, a composite string "string", and provides, as output, a (e.g. Boolean) circuit C, which is a logical construct. The circuit C can include, for example, indications of variables and operations, such as logical or Boolean operations applied to the variables. The circuit C can consist of Boolean gate operations over a finite field.

The operations in FIG. 3 are performed over a length of the composite string, and include performing Extractor operations on the composite string and hashes (using a universal hashing function) on outputs of Extractor operations. Two extractor operations are defined: Extractor$_v$( ) recognizes and/or matches variables in the composite string, and Extractor$_o$( ) recognizes and/or matches operators in the composite string. These extractor operations correspond to a generalized extraction function which can match the composite expression in strings with key variables and the logical relationships expressed in Boolean operators [AND, OR, XOR, etc].

Once the composite string is processed in this manner, a function Regexp( ) is applied to the outputs of the extractor and hashing operations shown. Regexp( ) is a generalized regular expression function which is configured to match the regular expression in strings with certain patterns and convert the parameters and patterns into a regular expression.

Output of the regular expression function is provided as input to a generalized conversion function CircuitGen( ). The generalized conversion function is configured to convert an input regular expression string into logical circuits (e.g. a Boolean circuit representation of the composite string).

Output of the generalized conversion function Circuit-Gen( ) is provided to a Karnaugh mapping function K-map( ). The Karnaugh mapping function is configured to reduce (where possible) logical gate complexity in a logical circuit provided thereto, in accordance with Karnaugh mapping principles. The Karnaugh mapping function provides the output circuit C of the polylithic syntax decomposition module 110.

Garbled Circuit Generation Module

Given a circuit C which represents a list of truth tables along the depth of the logical gate operations, embodiments of the present disclosure implement a garbled circuit scheme with non-interactive commitments, for example as described in "The Curious Case of Non-Interactive Commitments," M. Mahmoody and R. Pass, Sep. 10, 2012, cs.cornell.edu. This can facilitate the verifiers in achieving desired correctness and privacy properties of a verification. Garbling schemes such as described in M. Bellare, V. T. Hoang, and P. Rogaway. Foundations of garbled circuits. In T. Yu, G. Danezis, and V. D. Gligor, editors, ACM CCS 12, pages 784-796. ACM Press, October 2012 can be employed. In some embodiments, where k denotes a security parameter, the correctness property of a garbling scheme is defined as:

$$De(d,Ev(C,En(e,x)))=c(x),\forall (C,e,d)\in support(Gc(1^k, c)),x.$$

A Boolean circuit can be regarded as a Directed Acyclic Graph (DAG), i.e. a graph with no loops and edges each of which is directed from a source node to a destination node, with each node representing a unit of computation performing a specific operation op (e.g. AND/XOR). Moreover, all gates are fixed to have two input wires, a left wire and a right wire, which are denoted by l and r, respectively. A gate functions, when given a wire, to returns a bit value 0 or 1. The depth of a circuit is denoted by d, and its width is denoted by n. While there are many ways to represent a Boolean circuit, a one representation is as a d-by-n matrix M. In this representation, each layer $i\in (1, \ldots d)$ of a circuit has a fixed width n, with each entry being a gate.

The garbled circuit generation module is implemented to perform a partitioned garbled circuit construction operation. The partitioned garbled circuit may be created on the basis of the previously generated polylithic syntax expression, and the garbled circuit with public cryptographic primitives may be prepared. In particular, a partition scheme is implemented which is suitable for use with multiple verifiers that interact using a multi-party OT verification protocol. Accordingly an xGC (partitioned garbled circuit) can properly partition a garbled circuit C into multiple independent garbled circuits, as represented by or as recorded in a vector C($C_1$, $C_2$, . . . ). This can facilitate a secure division of information (e.g. a truth table or corresponding matrix) into multiple representations. Given a Yao's garbled circuit C with a matrix of inputs $[x_i]$ and the outputs $[o_i]$ within a truth table, embodiments securely divide the table into multiple representations of the truth table matrix T. This can make cryptographic proofs more suitable for multi-party verification. Accordingly, a Boolean circuit representing a composite statement may be partitioned, and the resulting circuits may be subjected to a garbling operation, for example to obscure true values of inputs.

Figure 4:
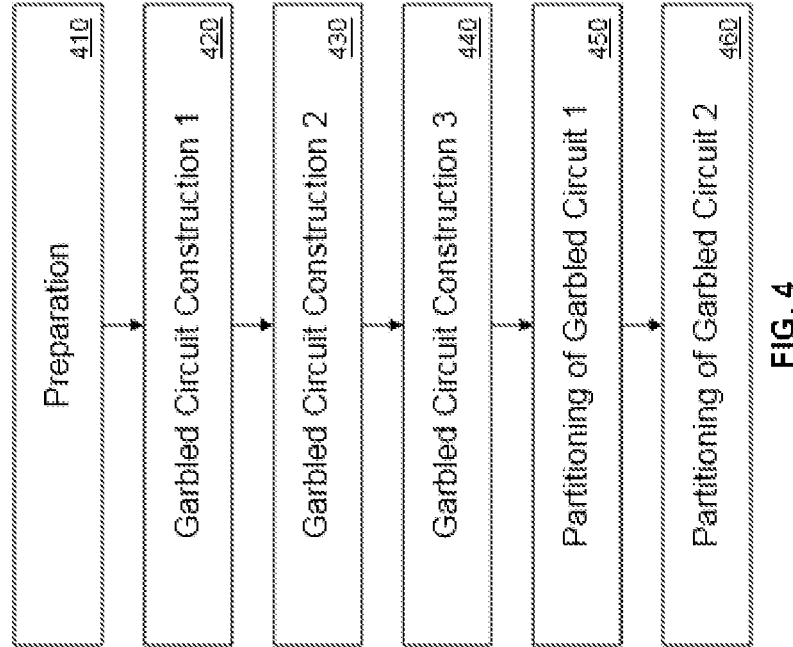
FIG. 4 illustrates garbled circuit generation operations in accordance with an embodiment of the present disclosure.
Figure 5:
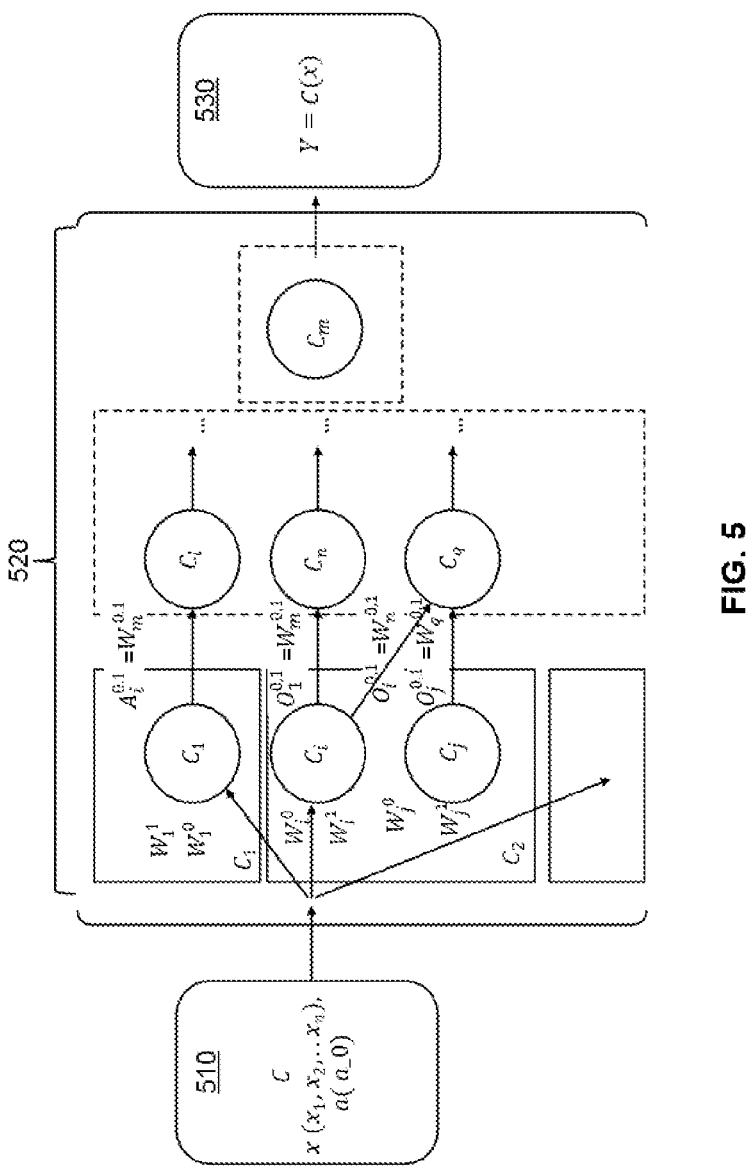
FIG. 5 illustrates an example of garbled circuit gate partitioning in accordance with an embodiment of the present disclosure.
Figure 6:
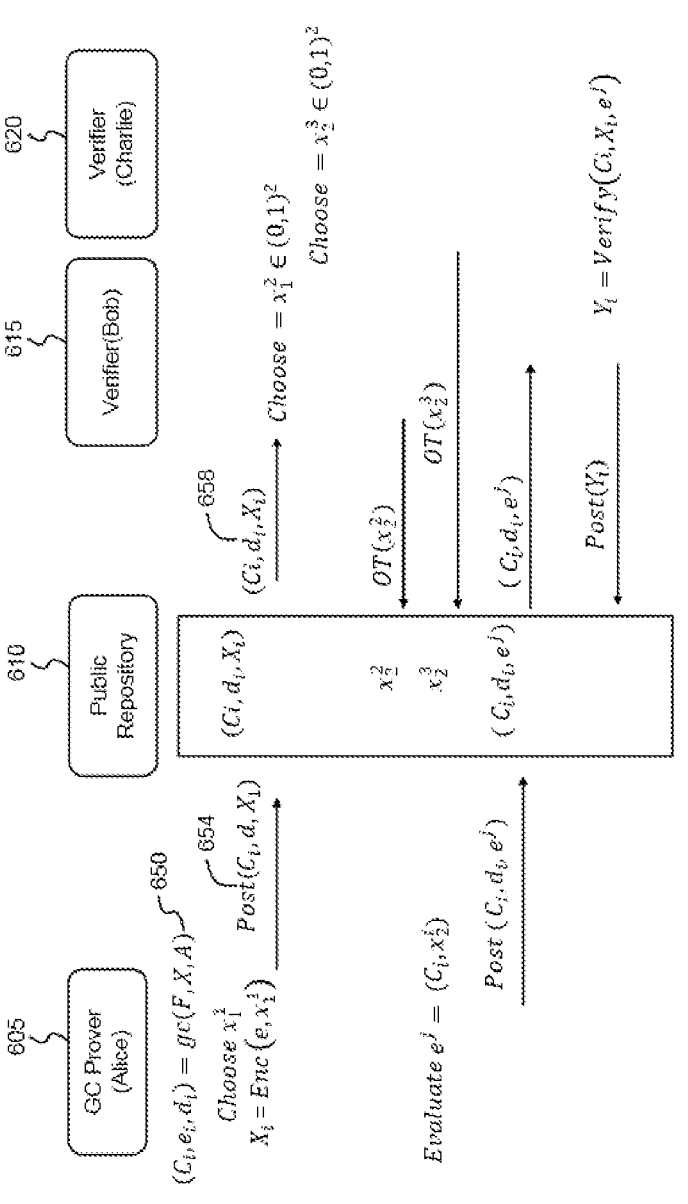
FIG. 6 illustrates an offline, non-interactive multiple parties oblivious transfer (OT) scheme in accordance with an embodiment of the present disclosure.

FIG. 4 illustrates operation 400 of a garbled circuit generation module 120, in accordance with an embodiment of the present disclosure. FIG. 5 illustrates an aspect of an operation of FIG. 4. FIG. 6 illustrates an aspect of another operation of FIG. 4.

Referring to FIG. 4, the operation 400 includes a preparation step 410. According to preparation 410, the multiparty Yao's garbled circuit is denoted with sorted inputs $x_1$, $x_2, \ldots, x_n$. Sorted inputs are paired, two at a time, with a corresponding Boolean gate. If n is odd, one additional (e.g. random, binary) value, for example given by $a_0 \oplus a_1$ as shown, where $a_0$ and $a_1$ are underlying random binary values, will be added as an auxiliary input. In a trust setup, the auxiliaries may be required to be destroyed as "toxic waste" after being used. Toxic waste may include parameters that assist in initialization and that are deleted (e.g. securely) after use. A new circuit C' is defined as output of the preparation step 410 according to:

$$C'(x_1, \ldots, x_n) = \begin{cases} C((x_1, x_2), \ldots, (x_{n-1}, x_n)), & n \text{ is even} \\ C((x_1, x_2), \ldots, (x_n, (a_0 \oplus a_1))), & n \text{ is odd} \end{cases}.$$

According to the first garbled circuit construction step 420, for each input pair $(x_i, x_j)$ where $x_i$ denotes the input from the prover, and $x_j$ denotes the input from the verifier, and for the wires and internal wires w of the circuit, a pair of keys $(k_w{}^0, k_w{}^1)$ is assigned.

According to the second garbled circuit construction step 430, for each gate of the circuit, four ciphertexts, which encrypt the corresponding key associated with the output wire, are generated according to the truth table of the table T. FIG. 5 illustrates the wire assignments and the outputs.

According to the third garbled circuit construction step 440, for each gate connected to an output wire of the circuit, a 0 or 1 is encrypted according to the same truth table as used in the Yao's garbled circuit scheme. (Encryption on Yao' s garbled circuit may be to obfuscate the output results by applying encryption algorithms, such as Advanced Encryption Standard (AES) algorithms.)

According to a first garbled circuit partitioning step 450, based on the Truth table T, the circuit matrix M is sliced (partitioned) horizontally to the penultimate gate (i.e. the $m-1^{st}$ gate (or circuit) before the last aggregating gates (or circuits)). The partitioning of garbled circuit is performed so as to maintain the integrity of inputs/outputs. In various embodiments, the partitioning may be implemented with an n to 1 fan-in to fan-out ratio. Specifically, such a scheme may require that the leftmost input gates are sliced per garbled logical gate, and after the first tier of inputs, the intermediate and last tier gates are aggregated into one garbled circuit.

An example of the partitioning of the gates is illustrated in FIG. 5. Garbling at (or of) the $i^{th}$ garbled circuit $C_i$ is the means by which the Boolean gate truth table is obfuscated. The prover picks the inputs of $W_i{}^0$ or of $W_i{}^1$ corresponding to the random inputs 0 or 1. Then the prover uses every pair of the inputs (00, 01, 10, 11) corresponding to the wires input to encrypt the output and create the Truth table. The process of Yao's garbled circuit can be found in Yao, Andrew Chi-Chih (1986). "How to generate and exchange secrets", 27th Annual Symposium on Foundations of Computer Science (SFCS 1986), Foundations of Computer Science, 1986, 27th Annual Symposium on pp. 162-167, doi: 10.1109/SFCS.1986.25, ISBN 978-0-8186-0740-0.

According to FIG. 5, $W_i{}^0$ denotes the inputs of $i^{th}$ garbled circuit with 0, $W_i{}^1$ denotes the inputs of $i^{th}$ garbled circuit with 1, and $o_i{}^{0,1}$ denotes the output truth table for the $i^{th}$ garbled circuit. The initial circuit C 510, partitioned circuit 520 and verification 540 are shown.

According to a second garbled circuit partitioning step 460, the partitioned (sliced) garbled circuit $(C_1, C_2, \ldots C_m)$ is added. The iterations of a garbled circuit protocol is then performed per circuit. A sub-step may further be performed as part of the partitioning step 460, in an iterative manner Alice (prover) runs a non-interactive multiple parties OT scheme for each partitioned circuit with multiple verifiers. This OT scheme may be performed offline. The OT scheme may be performed to obtain the partitioned garbled circuit verification $Y_i = C_i(x_i, x_j)$, except for the last circuit $C_m$.

For the last circuit $C_m$, the multi-party non-interactive oblivious transfer module 130 may be employed. Such an employment may be used to obtain a combined oblivious transfer (OT) verification represented by:

$$Y = C_m(x_m) = \bigcup_{i=1}^{m-1} C_i(x_i, x_j).$$

In some embodiments, the above-mentioned non-interactive multiple parties OT transfer scheme, performed offline, can be described as follows, with respect to FIG. 6. In a first step 650, Alice 605 represents the function $\hat{C}_i$ as a circuit and garbles circuit $C_i$. $\hat{C}_i$ has a total of 2 input wires corresponding to $(x_i, x_j)$. In a next step 654, Alice 605 sends all of the ciphertexts that are generated for garbled circuit $C_i$ to a public repository 610, such as DLT in blockchain, or a public accessible web portal. In a next step 658, through a verification assignment system, the verifiers {Bob 615, Charlie 620 . . . } commit to each of the garbled circuit verifications, by exchanging the randomly generated number $x_i{}^2$ in an OT commitment message OT with Alice. In a next step, Alice sends the corresponding keys for its own inputs wire $x_i{}^1$. In a next step, Alice 605 and the verifiers {Bob 615, Charlie 620, . . . } engage in an oblivious transfer protocol. Subsequently, the verifiers {Bob 615, Charlie 620, . . . } learn the keys $d_i{}^j$ for each partitioned gate. The verifiers individually start to evaluate the circuit using the keys obtained previously. Subsequently, the verifiers {Bob 615, Charlie 620, . . . } learn the output of $C(x_i, x_j)$. Alice 605 also learns that the verifiers have evaluated the results with outputs of $Y_1, Y_2, \ldots$. If $Y_i \neq y_i$, then Alice may select to abort the proof. Otherwise, Alice may proceed to invoke the multiparty non-interactive oblivious transfer module 130 for OT aggregation.

Multi-Party Non-Interactive Oblivious Transfer

Figure 7:
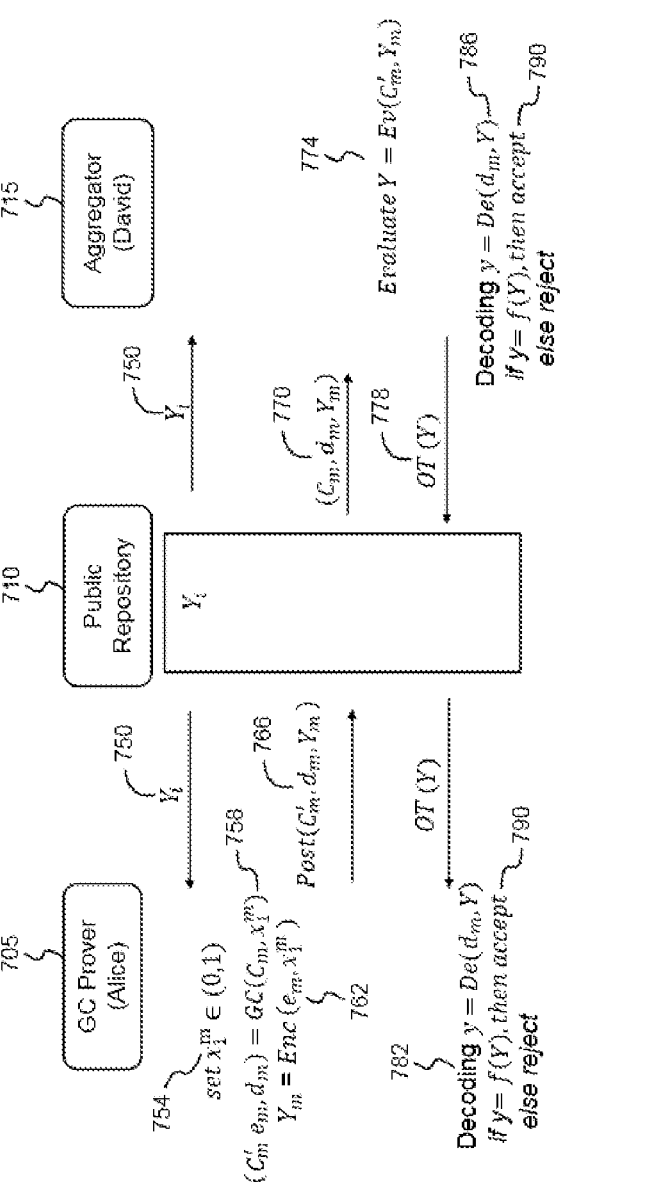
FIG. 7 illustrates OT and OT-aggregation performed in accordance with another embodiment of the present disclosure.

Following syntax decomposition and garbled circuit generation, an OT-aggregator OT protocol is implemented, for example using the multi-party non-interactive oblivious transfer module 130 for OT aggregation of FIG. 1. This protocol combines all of the partitioned garbled circuit verifications (previously performed) into an overall verification conclusion, in order to complete verification of the proof. In various embodiments, this involves the garbled circuit $C_m$ being built with XOR gates in order to mitigate computational costs. The expression of the circuit $C_m$ may be given as $Y = C_m(\cup_i{}^{m-1} Y_i \oplus X_i{}^m)$. It is desired to have both Prover (Alice) and Aggregator (David) agree on the computed $Y = y$, where $y = f(x)$. The OT aggregation facilitates security integrity. FIG. 7 illustrates operation of the OT-aggregator OT protocol, according to an embodiment of the present disclosure. Oblivious transfer may substantially preserve anonymity of parties. The aggregator (David) may be viewed as a verifier which aggregates verifications of other verifiers and provides a pass/fail result indicative of whether the proof is verified.

According to FIG. 7, in a first step, using the garbled circuit generation module 120, verifiers post the computed results $Y_i$ using the public repository 710, which Alice 705 and David 715 can fetch 750 from the portal. In a next step, Alice creates 754 random bits $x_1^m$, for example letting $x_1^m = (x_1^1 \oplus x_2^1) \oplus (x_1^2 \oplus x_2^2) \oplus \ldots$ . In a next step, Alice garbles 758 the circuit using the garbling operations as described elsewhere herein. The garbling operation outputs $(C_m', e_m, d_m) \leftarrow gc(C_m, x_1^m)$. Here, $gc(\cdot)$ denotes a Yao's garbled circuit generation algorithm, and $C_m = \cup_i^{m-1} Y_i \oplus X_i^m)$. The output includes a garbled circuit $C_m'$, an encoding function $e_m$ and a decoding function $d_m$. In a next step, Alice executes 762 a deterministic encoding operation $Enc(\ )$, which transforms $e_m$ and $x_1^m$ into the garbled input $Y_m = Enc(e_m, x_1^m)$.

In a next step, Alice 705 sends 766 the tuple $(C_m', d_m, Y_m)$ to the public repository 710, e.g. the DLT in a blockchain, or a Web portal. David 715 non-interactively obtains 770 the information from the public repository 710. David then creates a random bit $x_m^m \in (0,1)$. In another operation, David executes 774 the deterministic evaluation operation $Ev(\cdot)$, which outputs $Y = Ev(C_m', x_m^m)$. In a next step, David sends back 778 the output Y to Alice through the public repository 710. In a next step, Alice executes 782 the deterministic decoding operation $De(\cdot)$ to compute the output $y = De(d_m, Y)$, where $d_m$ denotes the decoding key. Concurrently, David also executes 786 the deterministic decoding operation $De(\cdot)$ to compute the output $y = De(d_m, Y)$. Next, both Alice and David check 790 whether $y = f(m \oplus x_m^m)$, where $f(\cdot)$ is the logical Boolean function before becoming a garbled circuit function $C(\cdot)$. If $y = f(m \oplus x_m^m)$, the OT aggregator protocol will accept the verification results. Otherwise, the verification result is not accepted, and Alice may abort the verification.

Figure 8:
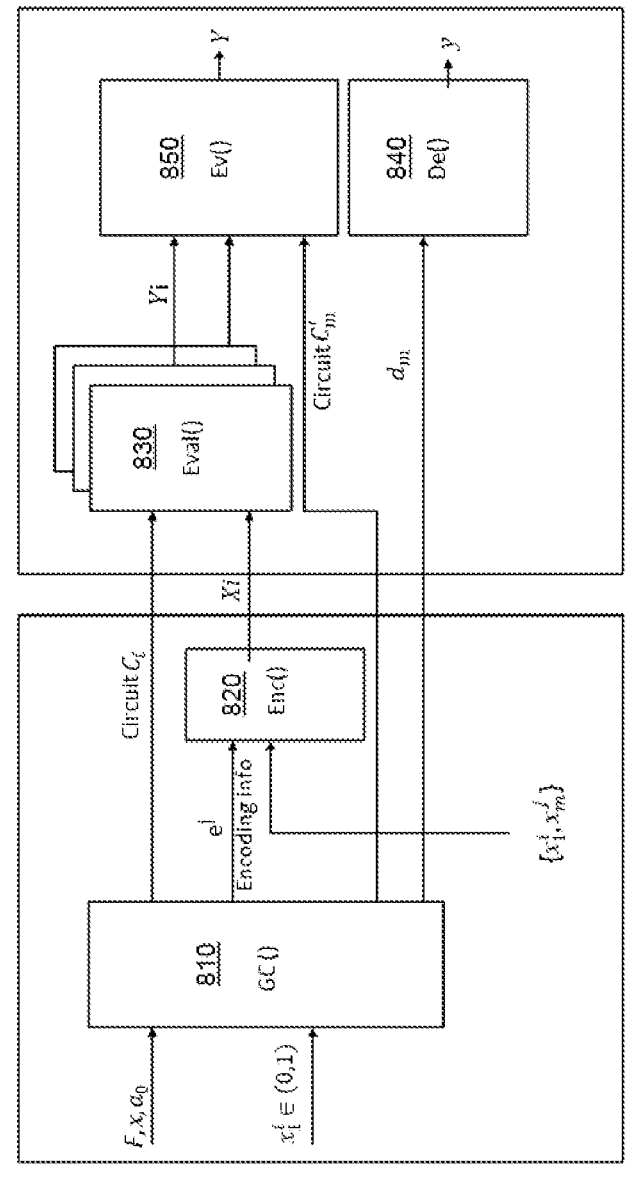
FIG. 8 illustrates interactions between cryptographic functions in accordance with an embodiment of the present disclosure.

An overall method, apparatus and system according to embodiments of the present disclosure, including garbled circuits involves multiple functions involving an adaptation of Yao's garbled circuits algorithm. FIG. 8 illustrates the interactions of the cryptographic functions according to one embodiment. The components within such an embodiment can be formalized as follows. A garbling operation $gc(\cdot)$ 810, as illustrated as a series of operations in FIG. 9a, is a randomized operation that transform a function $f$: $\{0,1\}^m \leftarrow \{0,1\}^n$ into a tuple $(C, e, d) \leftarrow gc(f)$. An encoding operation $Enc(\cdot)$ 820, as illustrated in FIG. 9b, turns a common reference string input $x \in \{0,1\}$ into a garbled circuit input $X = enc(x)$. The encoding operation uses function H operating on $e^{x^t \cdot x^j}$ to generate output X. An evaluation operation $Eval(\cdot)$ 830, as illustrated in FIG. 9c, denotes an evaluation function of a particular garbled function Con a garbled input x which gives a garbled output $Y = C(X)$. The evaluation operation uses function Decryption operating on inputs C and X to generate output Y. A decoding function $de(\cdot)$ 840, as illustrated in FIG. 9d, turns the garbled output Y into the final output $y = de(Y)$ which is made to be in accordance with the original (prior to being garbled) function $f(m)$. The decoding function performs an XOR operation on inputs d and Y to generate output y. A deterministic evaluation operation $Ev(\cdot)$ 850 is also shown, for example as performed by the aggregator (David) as described above.

According to various embodiments, the OT scheme can be performed based on an adaptation of a Bellare-Micali scheme (M. Bellare and S. Micali, Non-interactive oblivious transfer and applications, Proc. Advances in Cryptology-Crypto' 89, Springer-Verlag LNCS, 435 (1990), 547-557. The partitioned garbled circuit and the OT-aggregator may be based on an Oblivious Transfer scheme.

In more detail, and to illustrate in one embodiment, let G be a group of prime order p with generator g, let H be a hash function $\mathbb{G} \leftarrow \{0,1\}^{t'}$ which may be modeled as a random oracle. Let $m_0$ and $m_1$ be the sender's message and let $b \in \{0,1\}$ be the receiver's input. The OT protocol may be as follows. First, the sender S chooses $c \leftarrow \mathbb{G}$ and sends c to the receiver R. Next, the receiver R chooses a random key $k \leftarrow \mathbb{Z}_p$ and computes two public keys $y_b \leftarrow g^k$ and $y_{1-b} \leftarrow c/g^k$, and sends $y_0$, $y_1$ to the sender.

Next, if $y_0 \cdot y_1 \neq c$, then the sender S (e.g. immediately) aborts. Otherwise, S chooses $r_0$, $r_1 \leftarrow \mathbb{Z}_p$ and computes ciphertexts $$c_0 \leftarrow \left(g^{r_0}, H\!\left(y_0^{r_0}\right)m_0\right) \text{ and } c_1 \leftarrow \left(g^{r_1}, H\!\left(y_1^{r_1}\right)m_1\right).$$

The sender sends $c_0$, $c_1$ to the receiver R. Next, the receiver R parses the ciphertext $c_b = (v_0, v_1)$ and then decrypts using knowledge of k: $m_b = H(v_0^k)v_1$, and outputs $m_b$.

As described above, embodiments of the present disclosure provide for a zero-knowledge proof method, apparatus and system which can handle complex semantics of more than one statement. Such embodiments can be applied for example in distributed computing environments, such as blockchain environments. Embodiments of the present disclosure provide for a privacy preserving online verification method, apparatus and system over blockchain. Embodiments are anticipated to be less overhead and practical to implement than some prior implementations, in terms of both communication overheads and computation overhead.

Embodiments of the present disclosure provide for a substantially full syntax verification which allows for polylithic verification. Embodiments may exhibit an improved garbled circuit. Embodiments may be implemented with little to no pre-trust setup required. Embodiments may potentially exhibit proof generation time and size which is linear to the input size O(n). Embodiments may provide for full syntax verification to accomplish more comprehensive tasks. Embodiments may provide for security soundness with provable security. Embodiments may be non-interactive in nature. Embodiments may facilitate substantially total privacy preservation with fully homeomorphic encryption (FHE) capability.

Embodiments of the present disclosure can potentially improve operations of a networked computing environment by providing a secure and trustable way to convey information between devices controlled by different entities. Additionally, the above-mentioned potential features of embodiments may also improve the network operations. Such embodiments facilitate a networking and communications integrity which improves overall networking and computing operations. Embodiments of the present disclosure involve a particular set of steps, performed by parties in a networked computing environment, which achieve a goal such as secure and trustable network communications. Several different computing devices receive data, process the data, and provide data as output (e.g. to another one of the computing devices) in furtherance of such a goal.

Figure 10:
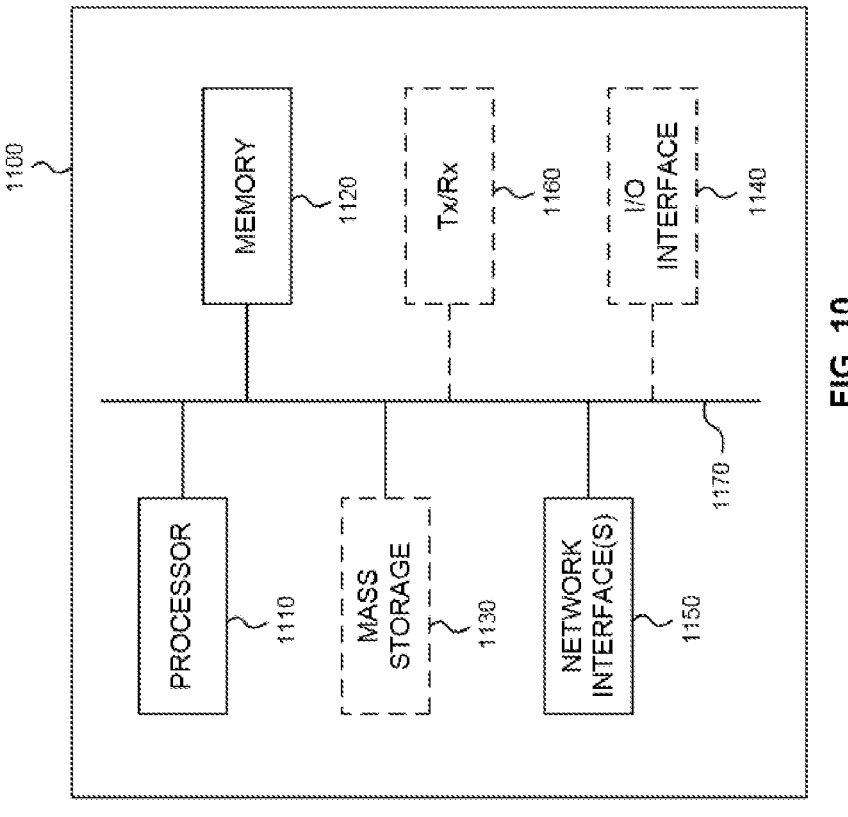
FIG. 10 is a schematic diagram of a computing device that may perform any or all of operations of the methods and features explicitly or implicitly described herein, according to different embodiments of the present disclosure.

FIG. 10 is a schematic diagram of a computing device 1100 that may perform any or all of operations of the methods and features explicitly or implicitly described herein, according to different embodiments of the present disclosure. For example, a computer equipped with network function may be configured as the computing device 1100. Multiple such computing devices can be networked together to provide a system as described herein, with different computing devices potentially operated by different parties.

As shown, the device 1100 may include a processor 1110, such as a Central Processing Unit (CPU) or specialized processors such as a Graphics Processing Unit (GPU) or other such processor unit, memory 1120, non-transitory mass storage 1130, input-output interface 1140, network interface 1150, and a transceiver 1160, all of which are communicatively coupled via bi-directional bus 1170. According to certain embodiments, any or all of the depicted elements may be utilized, or only a subset of the elements. Further, device 1100 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 1120 may include any type of non-transitory memory such as static random access memory (SRAM), dynamic random access memory (DRAM), synchronous DRAM (SDRAM), read-only memory (ROM), any combination of such, or the like. The mass storage element 1130 may include any type of non-transitory storage device, such as a solid state drive, hard disk drive, a magnetic disk drive, an optical disk drive, USB drive, or any computer program product configured to store data and machine executable program code. According to certain embodiments, the memory 1120 or mass storage 1130 may have recorded thereon statements and instructions executable by the processor 1110 for performing any of the aforementioned method operations described above.

Embodiments of the present disclosure can be implemented using electronics hardware, software, or a combination thereof. In some embodiments, the disclosure is implemented by one or multiple computer processors executing program instructions stored in memory. In some embodiments, the disclosure is implemented partially or fully in hardware, for example using one or more field programmable gate arrays (FPGAs) or application specific integrated circuits (ASICs) to rapidly perform processing operations.

It will be appreciated that, although specific embodiments of the disclosure have been described herein for purposes of illustration, various modifications may be made without departing from the scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure. In particular, it is within the scope of the disclosure to provide a computer program product or program element, or a program storage or memory device such as a magnetic or optical wire, tape or disc, or the like, for storing signals readable by a machine, for controlling the operation of a computer according to the method of the disclosure and/or to structure some or all of its components in accordance with the system of the disclosure.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can be a compact disc read-only memory (CD-ROM), USB flash disk, or a removable hard disk. The software product includes a number of instructions that enable a computer device (personal computer, server, or network device) to execute the methods provided in the embodiments of the present disclosure. For example, such an execution may correspond to a simulation of the logical operations as described herein. The software product may additionally or alternatively include a number of instructions that enable a computer device to execute operations for configuring or programming a digital logic apparatus in accordance with embodiments of the present disclosure.

Although the present disclosure and invention(s) associated therewith have been described with reference to specific features and embodiments, it is evident that various modifications and combinations can be made thereto without departing from such invention(s). The specification and drawings are, accordingly, to be regarded simply as an illustration of embodiments of the disclosure, for example as defined by the appended claims, and are contemplated to cover any and all modifications, variations, combinations or equivalents that fall within the scope of the present disclosure and its invention(s).

The invention claimed is:

1. A method for performing a zero knowledge proof, the method comprising:
   by a prover:
      performing a polylithic syntax decomposition on a statement to be proven;
      generating a garbled circuit indicative of the statement following polylithic syntax decomposition;
      partitioning the garbled circuit into a plurality of garbled circuit portions which collectively form a partitioned garbled circuit;
      transmitting the partitioned garbled circuit, via a shared repository, to multiple verifiers;
   by the multiple verifiers:
      jointly computing a digest of the garbled circuit, wherein each one of the multiple verifiers computes outputs of a corresponding one of the plurality of garbled circuit portions;
      by an aggregator belonging to the multiple verifiers: computing a value of a unified Boolean operation applied collectively to all of said outputs of the plurality of garbled circuit portions; and
      by the aggregator: determining whether the value of the unified Boolean operation is equal to an expected value and indicating that the zero knowledge proof is verified if and only if the value of the unified Boolean operation is equal to the expected value.

2. The method of claim 1, wherein the statement has multiple aspects or variables, and wherein the polylithic syntax decomposition comprises generating a Boolean circuit representation of the statement using multiple wires and multiple gates, the garbled circuit being generated from said Boolean circuit representation.

3. The method of claim 1, further comprising converting the statement into one or more regular expressions, and generating a Boolean circuit representation from said regular expressions, the garbled circuit being generated directly or indirectly from said Boolean circuit representation.

4. The method of claim 3, further comprising implementing a Karnaugh Map operation on the Boolean circuit representation to produce a simplified version of the Boolean circuit representation, the garbled circuit being generated directly or indirectly from the simplified version of the Boolean circuit representation.

5. The method of claim 1, wherein transmitting the partitioned garbled circuit to multiple verifiers is performed using a non-interactive oblivious transfer.

6. A system comprising:
a prover computing device configured to:
  perform a polylithic syntax decomposition on a statement to be proven;
  generate a garbled circuit indicative of the statement following polylithic syntax decomposition;
  partition the garbled circuit into a plurality of garbled circuit portions which collectively form a partitioned garbled circuit;
  transmit the partitioned garbled circuit, via a shared repository, to multiple verifier computing devices;
said multiple verifier computing devices, configured to:
  jointly compute a digest of the garbled circuit, wherein each one of the multiple verifier computing devices computes outputs of a corresponding one of the plurality of garbled circuit portions;
  by an aggregator device belonging to the multiple verifier computing devices: compute a value of a unified Boolean operation applied collectively to all of said outputs of the plurality of garbled circuit portions; and
  by the aggregator device: determine whether the value of the unified Boolean operation is equal to an expected value and indicate that a zero knowledge proof is verified if and only if the value of the unified Boolean operation is equal to the expected value.

7. The system of claim 6, wherein the statement has multiple aspects or variables, and wherein the polylithic syntax decomposition comprises generating a Boolean circuit representation of the statement using multiple wires and multiple gates, the garbled circuit being generated from said Boolean circuit representation.

8. The system of claim 6, wherein the prover device is further configured to: convert the statement into one or more regular expressions; and generate a Boolean circuit representation from said regular expressions, the garbled circuit being generated directly or indirectly from said Boolean circuit representation.

9. The system of claim 8, wherein the prover device is further configured to implement a Karnaugh Map operation on the Boolean circuit representation to produce a simplified version of the Boolean circuit representation, the garbled circuit being generated directly or indirectly from the simplified version of the Boolean circuit representation.

10. The system of claim 6, wherein the prover device is configured to transmit the partitioned garbled circuit to the multiple verifier computing devices using a non-interactive oblivious transfer.

11. The system of claim 6, wherein the prover device and the verifier devices, multiple verifier computing devices, or both, are configured to perform a multiparty oblivious transfer scheme to facilitate interaction therebetween.

12. A method for performing a zero knowledge proof, the method comprising:
by a prover:
  performing a polylithic syntax decomposition on a statement to be proven;
  generating a garbled circuit indicative of the statement following polylithic syntax decomposition;
  partitioning the garbled circuit into a plurality of garbled circuit portions which collectively form a partitioned garbled circuit;
  transmitting the partitioned garbled circuit, via a shared repository, to multiple verifiers.

13. The method of claim 12, wherein the statement has multiple aspects or variables, and wherein the polylithic syntax decomposition comprises generating a Boolean circuit representation of the statement using multiple wires and multiple gates, the garbled circuit being generated from said Boolean circuit representation.

14. The method of claim 12, further comprising converting the statement into one or more regular expressions, and generating a Boolean circuit representation from said regular expressions, the garbled circuit being generated directly or indirectly from said Boolean circuit representation.

15. The method of claim 14, further comprising implementing a Karnaugh Map operation on the Boolean circuit representation to produce a simplified version of the Boolean circuit representation, the garbled circuit being generated directly or indirectly from the simplified version of the Boolean circuit representation.

16. The method of claim 12, wherein transmitting the partitioned garbled circuit to the multiple verifiers is performed using a non-interactive oblivious transfer.

17. The method of claim 12, further comprising performing a multiparty oblivious transfer scheme to facilitate interaction between the prover and the verifiers.

18. The method of claim 12, further comprising:
by a verifier:
receiving the partitioned garbled circuit from the prover, via the shared repository;
cooperating with one or more other verifiers to jointly compute a digest of the garbled circuit, wherein the verifier and the one or more other verifiers each computes respective outputs of a corresponding one of the plurality of garbled circuit portions;
wherein an aggregator belonging to the verifier and the one or more other verifiers:
computes a value of a unified Boolean operation applied collectively to all of said outputs of the plurality of garbled circuit portions; and
determines whether the value of the unified Boolean operation is equal to an expected value and indicate that the zero knowledge proof is verified if and only if the value of the unified Boolean operation is equal to the expected value.

19. The method of claim 18, further comprising performing a multiparty oblivious transfer scheme to facilitate interaction between the prover and the verifier, or between the verifier and the one or more other verifiers, or both.

* * * * *